(12) United States Patent
Kim (10) Patent No.: US 11,450,072 B2
(45) Date of Patent: Sep. 20, 2022

(54) PHYSICAL TARGET MOVEMENT-MIRRORING AVATAR SUPERIMPOSITION AND VISUALIZATION SYSTEM AND METHOD IN A MIXED-REALITY ENVIRONMENT

(71) Applicant: DOUBLEME, INC, San Jose, CA (US)

(72) Inventor: Heekwan Kim, San Jose, CA (US)

(73) Assignee: DoubleMe, Inc., Seoul (KR)

( * ) Notice: Subject to any disclaimer, the term of this patent is extended or adjusted under 35 U.S.C. 154(b) by 12 days.

(21) Appl. No.: 17/092,247

(22) Filed: Nov. 7, 2020

(65) Prior Publication Data
US 2022/0148266 A1 May 12, 2022

(51) Int. Cl.
| | |
|---|---|
| *G06T 15/00* | (2011.01) |
| *G06T 19/00* | (2011.01) |
| *G06T 1/20* | (2006.01) |
| *H04N 13/111* | (2018.01) |
| *G06T 7/246* | (2017.01) |
| *H04N 13/332* | (2018.01) |
| *G06V 40/20* | (2022.01) |
| *G06V 40/16* | (2022.01) |

(52) U.S. Cl.
CPC ............ *G06T 19/006* (2013.01); *G06T 1/20* (2013.01); *G06T 7/246* (2017.01); *G06V 40/171* (2022.01); *G06V 40/176* (2022.01); *G06V 40/23* (2022.01); *H04N 13/111* (2018.05); *H04N 13/332* (2018.05); *G06T 2200/24* (2013.01)

(58) Field of Classification Search
CPC ......... G06T 19/00; G06T 17/20; G06T 17/00; G06T 15/10; G06T 15/00
USPC ....................................................... 345/419
See application file for complete search history.

(56) References Cited

U.S. PATENT DOCUMENTS

| | | | |
|---|---|---|---|
| 2013/0100140 A1* | 4/2013 | Ye | G06T 13/20 345/473 |
| 2019/0019321 A1* | 1/2019 | Thielen | G06T 19/20 |
| 2019/0132948 A1* | 5/2019 | Longinotti-Buitoni | A61B 5/7278 |
| 2020/0371472 A1* | 11/2020 | Karafin | G06Q 30/0255 |

* cited by examiner

*Primary Examiner* — Gordon G Liu
(74) *Attorney, Agent, or Firm* — Invent Capture, LLC.; Samuel S. Cho (57) ABSTRACT

A novel electronic system provides real-time movement-mirroring and three-dimensional (3D) holographic avatar superimposition on a human subject or another physical target located in a holographic mixed-reality environment. In the visual perspectives of a holographic mixed-reality environment viewer wearing a mixed-reality headset or another mixed-reality visualization device, the physical target becomes invisible and is replaced by a 3D holographic avatar in the same coordinates of the physical space where the holographic mixed-reality environment is active. Typically, the 3D holographic avatar is chosen by a system user to represent or "body double" a particular physical target prior to activating the holographic mixed-reality environment. Once activated, the novel electronic system provides subject feature extraction, subject-to-avatar recognition, subject pose and expression matching, motion retargeting, and movement mirroring to reflect detailed movements and facial or bodily expressions of the physical target in the 3D holographic avatar in real time.

10 Claims, 6 Drawing Sheets

A System Block Diagram for Physical Target Movement-Mirroring Avatar Superimposition & Visualization Creation System in MR Environment

FIG. 1

Avatars Enveloping Physical Targets in a Mixed-Reality Environment

PHYSICAL TARGET MOVEMENT-MIRRORING AVATAR SUPERIMPOSITION AND VISUALIZATION SYSTEM AND METHOD IN A MIXED-REALITY ENVIRONMENT

BACKGROUND OF THE INVENTION

The present invention generally relates to mixed and immersive three-dimensional (3D) synthetic computer-graphic objects and physical objects visualizations in a mixed-reality environment. In particular, the present invention relates to physical target movement-mirroring 3D avatar holographic superimposition and visualization systems and related methods of operations in a mixed-reality environment. Furthermore, the present invention also relates to computer graphics generation of 3D avatars as superimposed real-time motion representations of targeted human subjects in a holographic mixed-reality (HMR) live environment for mixed-reality viewers. In addition, the present invention also relates to immersive mixed-reality visualization of holographic 3D avatars that "envelope" corresponding targeted human subjects and real physical objects in the same physical space of the HMR live environment.

In recent years, virtual reality (VR) and augmented reality (AR) applications are gaining increasing popularity and relevance in electronic user applications. For example, VR headsets for computers and portable devices are able to provide interactive and stereoscopic gaming experiences, training simulations, and educational environments for users wearing the VR headsets. In another example, augmented reality (AR) mobile applications are designed to add texts, descriptions, or added (i.e. "augmented") digitized materials to physical objects if a user wears AR goggles or utilizes AR-compatible mobile applications executed in portable devices. For one of ordinary skill in the art, virtual reality (VR) refers to a completely computer-generated synthetic environment with no direct correlations to a real physical space or a real physical object, while augmented reality (AR) refers to descriptive digital materials that are displayed next to a machine-recognized real physical object to add or "augment" more information to the physical reality.

Nevertheless, conventional VR and AR applications are unable to provide seamless integration of ultra-high resolution and lifelike holographic three-dimensional objects that can be juxtaposed or intermixed with real physical objects in the same physical location for interactive and immersive mixed experiences, because the conventional VR applications merely provide user interactions in a purely computer-generated synthetic (i.e. virtual) environment with no correlation to physical objects in a real physical space, while the conventional AR applications merely provide additional informational overlays (i.e. information augmentation) to machine-recognized real physical objects via partially-transparent AR goggles or AR-enabled camera applications in mobile devices.

A recent evolution of conventional VR and AR applications has resulted in an innovative intermixture of computer-generated lifelike holographic objects and real objects that are synchronized and correlated to a particular physical space (i.e. as a "mixed-reality" (MR) environment) for immersive user interactions during the user's visit to the particular physical space. However, the mixed-reality applications in the consumer electronics market today are primarily focused on display and interactions between synthetically-created holographic objects and physical objects. For example, in existing MR applications, computer graphics-created synthetic cartoon holograms may be positioned next to a physical painting on a physical wall, and be viewable simultaneously through a mixed-reality environment viewing headset unit. In such conventional mixed-reality environment creation layouts, holograms are created in a computer graphics server first in isolation from physical objects in the same physical space. Then, reference coordinates are utilized at a later timeframe to correlate the position of the holograms to the physical objects in the same physical space for intermixed display of the holograms and the physical objects through a user's MR-viewing headset unit.

Presently, the mixed-reality display systems in the market today are unable to provide more advanced levels of interactivity and visualizations among holograms and physical objects. For example, conventional mixed-reality display systems are not designed to or capable of providing subject motion feedback-based dynamic rendering of holograms for display in real time within a mixed-reality environment. Likewise, conventional mixed-reality display systems are unable to accommodate virtualized switchover roles and images between holograms and physical objects in the mixed-reality environment. These types of advanced levels of interactivity and visualizations, if made possible, may increase the appeal of widespread deployment of mixed-reality applications for wearable display devices and other portable electronic devices by enhancing mixed-reality environment design flexibility and immersive contents in related mixed-reality applications.

Therefore, it may be advantageous to provide a novel electronic system and a related method of operation that enable more advanced levels of interactivity and visualizations in a mixed-reality environment, such as virtualized switchover roles and images between holograms and physical objects, and dynamic real-time rendering of holographic motions superimposed on targeted physical objects.

Furthermore, it may also be advantageous to provide a novel electronic system and a related method of operation that accommodate physical target movement-mirroring avatar superimposition and visualization in a mixed-reality environment for enhanced immersive mixed-reality contents and mixed-reality choreographic scenario design flexibilities.

In addition, it may also be advantageous to provide a novel electronic system that accommodates a mixed-reality system user to create, select, or modify a preferred 3D holographic avatar as a holographically motion-mirrored and fully encapsulated computerized visual representation of herself or himself for real-time viewing by other users immersed in a mixed-reality environment.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

In one embodiment of the invention, a method for creating physical target movement-mirroring three-dimensional (3D) holographic avatar superimposition and visualization in a mixed-reality environment is disclosed. This method comprises the steps of: (1) choosing, via a system user application interface, a 3D holographic avatar that visually encapsulates a physical target located in the mixed-reality environment, which is generated by a physical target movement-mirroring 3D holographic avatar superimposition and visualization creation system; (2) recognizing and correlating the physical target with the 3D holographic avatar by capturing an image of the physical target in a camera of a mixed-reality headset worn by a holographic mixed-reality (HMR) viewer, extracting graphical feature points from the image, comparing the graphical feature points to various 3D holographic avatars stored in a physical target movement-mirroring avatar database, and finding a correct match for a graphical similarity between the physical target and the 3D holographic avatar previously chosen by a user to encapsulate the physical target; (3) tracking motions and poses of the physical target via a continuous image capturing from the camera on the mixed-reality headset and a real-time extraction of moving graphical feature points of the physical target; (4) retargeting the motions and the poses of the physical target to the 3D holographic avatar by matching tracking points of similar body parts and facial features between the physical target and the 3D holographic avatar, and by executing a deep-learning pose estimation engine that retrieves a matching pose feature from a pre-defined pose feature database for 3D holographic avatars; (5) continuously matching the tracking points of similar body parts and facial features between the physical target and the 3D holographic avatar in real time as long as the physical target is making a movement or a change in facial or bodily expressions while being present in the mixed-reality environment; (6) continuously executing motion retargeting, in real time, from the physical target to the 3D holographic avatar to mirror and mimic the movement or the change in facial or bodily expressions; and (7) from a visual perspective of the HMR viewer wearing the mixed-reality headset or another viewing device, completely encapsulating the physical target to replace a naked-eye view of the physical target with the 3D holographic avatar that also mirrors and mimics the motions and the poses of the physical target in real time, whenever the mixed-reality environment is active.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of description of shapes, configurations, and/or other symbolic representations that directly or indirectly resemble one or more electronic systems and methods for physical target movement-mirroring avatar superimposition and visualization creation in a mixed-reality environment. These process descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment. Furthermore, separate or alternative embodiments are not necessarily mutually exclusive of other embodiments. Moreover, the order of blocks in process flowcharts or diagrams representing one or more embodiments of the invention does not inherently indicate any particular order and do not imply any limitations in the invention.

One objective of an embodiment of the present invention is to provide a novel electronic system and a related method of operation that enable more advanced levels of interactivity and visualizations in a mixed-reality environment. Examples of such advanced levels of interactivity and visualizations in a mixed-reality environment include, but are not limited to, virtualized switchover roles and images between holograms and physical objects, and dynamic real-time rendering of holographic motions superimposed on targeted physical objects.

Furthermore, another objective of an embodiment of the invention is to provide a novel electronic system and a related method of operation that accommodate physical target movement-mirroring avatar superimposition and visualization in a mixed-reality environment for enhanced immersive mixed-reality contents and mixed-reality choreographic scenario design flexibilities.

Another objective of an embodiment of the present invention is to provide a novel electronic system that empowers a mixed-reality system user with electronic user interfaces, physical target movement-mirroring avatar superimposition user apps and avatar databases, and app repository developer tools to create, select, or modify a preferred 3D holographic avatar as a holographically motion-mirrored and fully enveloped or encapsulated computerized visual representation of herself or himself for real-time viewing by other users immersed in a mixed-reality environment.

For the purpose of describing the invention, a term referred to as "mixed reality," or "MR," as an acronym, is defined as an intermixture of computer-generated lifelike holographic objects and real physical objects that are synchronized and correlated to a particular physical space for immersive user interactions during the user's visit to the particular physical space. Typically, unlike conventional augmented reality applications, the computer-generated lifelike holographic objects are ultra high-resolution (e.g. 4K/UHD) or high-resolution (e.g. HD quality or above) three-dimensional synthetic objects that are intermixed and/or juxtaposed to real physical objects, wherein a viewer immersed in the mixed-reality environment is often unable to distinguish the synthetic nature of the computer-generated lifelike holographic objects and the real physical objects provided by the mixed-reality environment.

The viewer immersed in the mixed-reality environment may be locally present at the particular physical space correlated and synchronized with the computer-generated lifelike holographic objects and the real physical objects in one or more mixed-reality artificial layers superimposed on the particular physical space. Alternatively, the viewer may also be remotely located in a different physical space but still correlated and synchronized with the particular physical space to be immersed in a holographic mixed-reality (HMR) environment that provides the computer-generated lifelike holographic objects, wherein the HMR environment is synthesized and guided in real time through a mixed-reality recording headset worn by an onsite surrogate visitor to the particular physical space. In the alternate embodiment of the invention, the remotely-located viewer (i.e. a remote visitor) is also required to wear a head-mounted display (HMD) device or at least utilize a mobile electronic device configured to execute a mixed-reality mobile application, in order to experience the holographic mixed-reality (HMR) environment streaming from a physical target movement-mirroring avatar superimposition and visualization creation system.

Moreover, for the purpose of describing the invention, a term referred to as "avatar" is defined as a three-dimensional (3D) model or a hologram that represents or symbolizes a physical target, which is also present in a holographic mixed-reality (HMR) environment. In a preferred embodiment of the invention, avatars may be humanized figures, cartoon figures, animals, or nonlife objects. In addition, examples of "physical targets" that can be represented by avatars include, but are not limited to, a human subject, an animal, and an inanimate object (e.g. a painting, a sculpture, a piece of furniture, etc.) that are physically and originally present in the HMR environment as real objects, and not as holograms.

Figure 1:
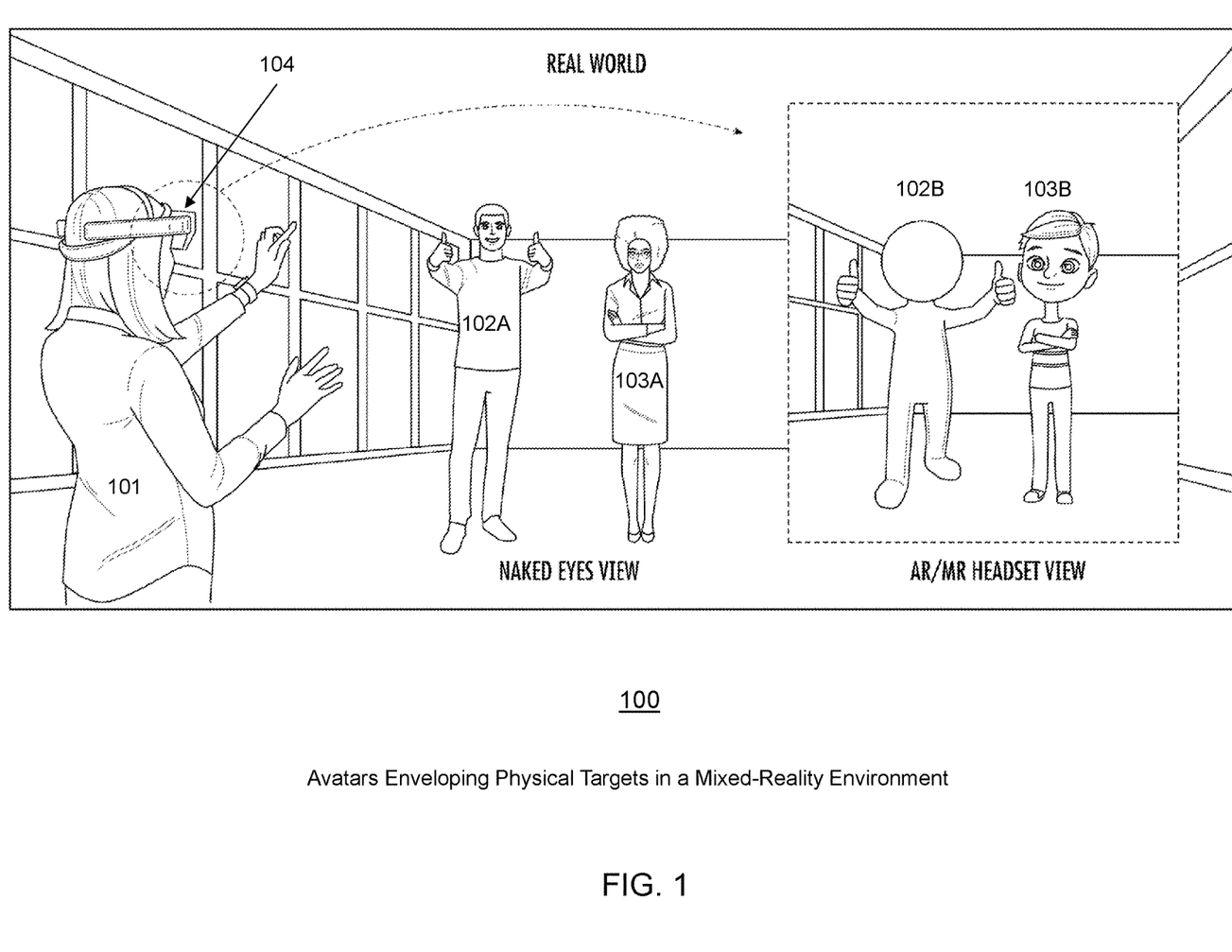
FIG. 1 shows three-dimensional (3D) holographic avatars enveloping physical targets in a mixed-reality environment generated by a physical target movement-mirroring avatar superimposition and visualization creation system, in accordance with an embodiment of the invention.
Figure 2:
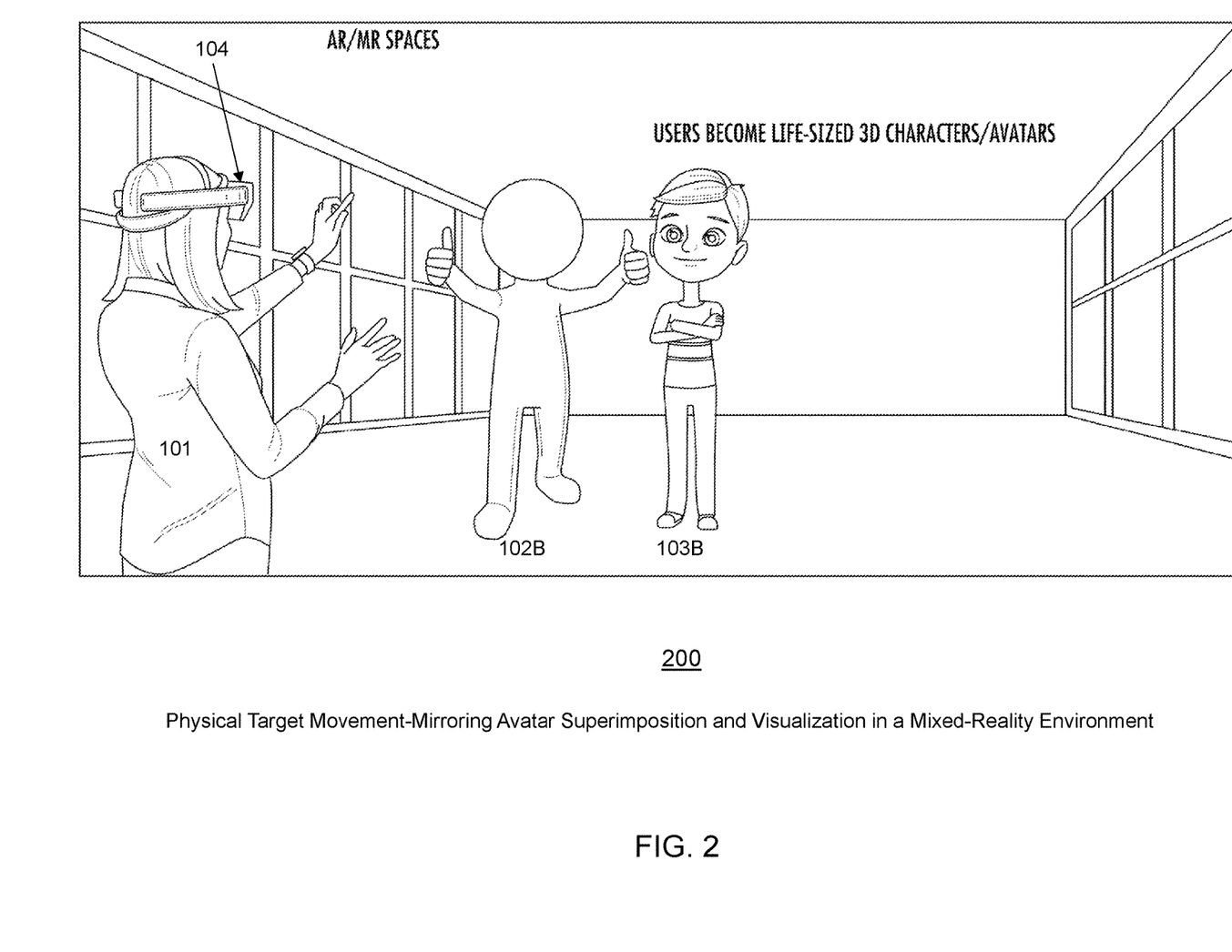
FIG. 2 shows an instance of physical target movement-mirroring avatar superimposition and visualization in a mixed-reality environment provided by the novel electronic system, in accordance with an embodiment of the invention.

In addition, for the purpose of describing the invention, the words "envelope," "encapsulate," or any other verb, adjective, or adverb variation of these two words refer to a computer graphics-based transformation of a real image of a physical target into a holographic avatar of a user's choice with real-time motion mirroring, so that any movements and gestures of the real image are entirely mimicked and reflected as those of the holographic avatar in real time, when viewed through a head-mounted display (HMD) or another portable electronic device that provides a holographic mixed-reality (HMR) environment. In a preferred embodiment of the invention, a physical target that undergoes a user-chosen avatar envelopment or encapsulation in the HMR environment will appear as if the physical target is fully "enveloped" or "encapsulated" in a holographic "jumpsuit," thus making the user-chosen avatar a real-time motion-mirrored representation of the physical target, while the physical target itself becomes invisible in the eyes of the HMR viewers who wear headsets or other mixed-reality viewing equipment, as illustrated in FIGS. 1-2.

Furthermore, for the purpose of describing the invention, a term referred to as "HoloWalks" is defined as a novel electronic system that provides, executes, enables, and manages a three-dimensional (3D) mixed-reality (MR) space with at least one MR artificial layer superimposed on a physical space, a mixed-reality (MR) experience construction conceived by an MR experience designer (i.e. a user interaction choreography designer), and a 3D MR experience sharing with tourists, visitors, and other users who visit the physical space while wearing a head-mounted display device or utilizing an MR-enabled mobile application executed on a mobile device.

In addition, for the purpose of describing the invention, a term referred to as a "mixed-reality artificial layer" is defined as a computer-generated graphics layer in which mixed-reality objects (MROs) and/or mixed-reality holographic avatars are created and positioned by a physical target movement-mirroring avatar superimposition and visualization creation system onto virtual coordinates, which correlate to a particular physical space of a viewer's interest, such as a work collaborative room, a concert hall, a museum, an exhibition venue, a lecture hall, a research facility, or a tourist destination.

Moreover, for the purpose of describing the invention, a term referred to as "hologram" is defined as a three-dimensional holographic object configured to be displayed from a head-mounted display (HMD) device, a mobile device executing a mixed-reality visual mobile application, or another electronic device with a visual display unit. Typically, a hologram is capable of being animated as a three-dimensional element over a defined period of time. Examples of holograms utilized in mixed-reality environments generated by a physical target movement-mirroring avatar superimposition and visualization creation system include, but are not limited to, a cartoon avatar, a humanized avatar, a mixed-reality object (MRO), or another mixed-reality hologram, which can be intermixed with or juxtaposed to physical objects for seamlessly-vivid visualizations of both artificial holograms and physical objects.

In addition, for the purpose of describing the invention, a term referred to as "three-dimensional model," or "3D model," is defined as one or more computer-generated three-dimensional avatars, images, videos, or holograms. In a preferred embodiment of the invention, a computerized 3D model is created as a hologram after multi-angle video data are extracted, transformed, and reconstructed by three-dimensional graphics processing algorithms executed in a computer system or in a cloud computing resource comprising a plurality of networked and parallel-processing computer systems. The computer-generated 3D model can then be utilized as a mixed-reality object (MRO) or a humanized mixed-reality hologram (MRH) in a mixed-reality artificial layer superimposed on a particular physical space correlated by virtual coordinates from a physical target movement-mirroring avatar superimposition and visualization creation system.

Moreover, for the purpose of describing the invention, a term referred to as "cloud" is defined as a scalable data network-connected and/or parallel-processing environment for complex graphics computations, transformations, and processing. The data network-connected and/or parallel-processing environment can be provided using a physical connection, a wireless connection, or both. For example, a cloud computing resource comprising a first cloud computing server, a second cloud computing server, and/or any additional number of cloud computing servers can each extract and transform a portion of multi-angle video data simultaneously as part of a scalable parallel processing algorithm, which performs temporal, spatial, and photometrical calibrations, and executes depth map computation, voxel grid reconstruction, and deformed mesh generation. A scalable number of cloud computing servers enables a real-time or near real-time transformation and reconstruction of 3D models after consumer video recording devices transmit multi-angle video data to the cloud computing resource.

Furthermore, for the purpose of describing the invention, a term referred to as "HoloPortal" is defined as a 3D model creation studio that incorporates cameras positioned on a multiple number of angles around a stage, where a target object is placed for video footage recording at the multiple number of angles around the stage. The 3D model creation studio also typically incorporates a real-time or near real-time 3D reconstruction electronic system, which is configured to perform silhouette extractions, 3D voxel generation, 3D mesh generation, and texture and detail-adding operations to create a user-controllable three-dimensional model that resembles the target object.

In addition, for the purpose of describing the invention, a term referred to as "HoloCloud" is defined as a novel electronic system that captures live multi-angle video feeds of a target object with portable electronic devices and generates a user-controllable three-dimensional model by performing various 3D reconstruction calculations and procedures in a scalable cloud computing network. In one example, a HoloCloud system comprises a plurality of common consumer-level video recording devices (e.g. smartphones, camcorders, digital cameras, etc.) positioned in various angles surrounding a target object (e.g. a human, an animal, a moving object, etc.), a scalable number of graphic processing units (GPU's) in a scalable cloud computing platform, a 3D pre-processing module, a 3D reconstruction module, a background 3D graphics content, a 360-degree virtual reality or video content, and a dynamic 3D model created by the 3D reconstruction module. In one embodiment, the 3D pre-processing module and the 3D reconstruction modules are graphics processing software executed in the scalable number of graphic processing units (GPU's). In another embodiment, these modules may be hard-coded specialized semiconductor chipsets or another hardware that operate in conjunction with the GPU's to provide 3D processing and reconstruction.

FIG. 1 shows three-dimensional (3D) holographic avatars (102B, 103B) enveloping physical targets (102A, 103A) in a mixed-reality environment (100) generated by a physical target movement-mirroring avatar superimposition and visualization creation system, in accordance with an embodiment of the invention. In this illustration, a first physical target (102A) is a first human participant and a second physical target (103A) is a second human participant present in a physical space, which is part of the mixed-reality environment (100) of FIG. 1.

When a holographic mixed-reality (HMR) viewer (101) wears a mixed-reality headset (104) or utilizes another electronic equipment to experience the mixed-reality environment (100), as shown in FIG. 1, the HMR viewer (101) sees a first 3D holographic avatar (102B) encapsulating and motion-mirroring the first physical target (102A), and a second 3D holographic avatar (103B) encapsulating and motion-mirroring the second physical target (103A) in real time. If a physical target motion-mirrored by a 3D holographic avatar is a human or an animal, the physical target movement-mirroring avatar superimposition and visualization creation system tracks the physical target's movements as well as facial expressions, and then provides novel graphics processing steps on the fly to ensure that the 3D holographic avatar mimics all of the physical target's motions and expressions in real time For example, if a human participant designated as the second physical target (103A) in FIG. 1 smiles or winks, the second 3D holographic avatar (103B) that encapsulates the human participant in the mixed-reality environment (100) also smiles or winks to mirror the human participant in real time. In this example, the second 3D holographic avatar (103B) is preferably a full life-size 3D avatar capable of rapid and natural motions that directly mirror, correlate, or reflect the underlying motions of the second physical target (103A). Preferably, the physical target movement-mirroring avatar superimposition and visualization creation system incorporates a scalable number of high performance computer servers and graphics processing units to enable the real-time physical target movement-mirroring and avatar superimposition by taking several graphics-intensive processing steps.

In one instance of an embodiment of the invention, the physical target movement-mirroring avatar superimposition and visualization steps may involve the following multiple steps: (1) recognizing and correlating a particular physical target with a chosen 3D avatar previously synthesized or selected by a system user; (2) tracking motions and poses from the particular physical target and retargeting such motions and poses to the chosen 3D avatar based on deep-learning pose estimations; (3) matching extracted features or tracking points from the particular physical target with the chosen 3D avatar in real time; (4) executing motion retargeting by correlating the real-time motion tracking points of the particular physical target to the chosen 3D avatar to mirror and mimic the movements and the expressions of the particular physical target in the chosen 3D avatar; (5) completely enveloping or encapsulating the particular physical target to replace the naked-eye view of the particular physical target with the chosen 3D avatar that also mirrors and mimics the underlying motions and the expressions of the particular physical target, whenever the system viewer is immersed in a mixed-reality environment through a mixed-reality headset gear or another viewing device.

In a preferred embodiment of the invention, a specific 3D holographic avatar (e.g. 102B, 103B) is selected by a system user (e.g. 101, 102A, or 103A) to represent a particular physical target through a system user interface. Once selected and activated to represent the particular physical target, the specific 3D holographic avatar is configured to encapsulate or envelope the particular physical target completely, thus making the particular physical target invisible from the HMR viewer's (101) perspective. The invisible physical target is visually and electronically replaced and motion-mirrored with the specific 3D holographic avatar while the mixed-reality environment (100) is active. Furthermore, as also shown in FIG. 1, the physical targets (102A, 103A) are actually present in the physical space and certainly visible to naked-eyes viewers who are not wearing or utilizing mixed-reality viewing equipment.

FIG. 2 shows an instance of physical target movement-mirroring avatar superimposition and visualization in a mixed-reality environment (200) provided by the novel electronic system, in accordance with an embodiment of the invention. As shown in this figure, the first physical target (i.e. 102A in FIG. 1) is now visually invisible and completely enveloped by the first 3D holographic avatar (102B), which encapsulates and motion-mirrors the first physical target (i.e. 102A in FIG. 1) in real time, when viewed in the mixed-reality environment (200) by the holographic mixed-reality (HMR) viewer (101). Similarly, the second physical target (i.e. 103A in FIG. 1) is now also visually invisible and completely enveloped by the second 3D holographic avatar (103B), which encapsulates and motion-mirrors the second physical target (i.e. 103A in FIG. 1) in real time, when viewed in the mixed-reality environment (200) by the holographic mixed-reality (HMR) viewer (101).

It should be noted that in the mixed-reality environment (200) as illustrated in FIG. 2, all of the physical targets (i.e. 102A, 103A in FIG. 1) as well as the HMR viewer (101) are still physically present in the physical space, but in the eyes of the HMR viewer (101) utilizing the mixed-reality headset (104) to immerse in the mixed-reality environment (200), the physical targets have transformed into life-sized 3D avatars that also mirror and reflect the underlying physical targets' movements and expressions in real time. In the preferred embodiment of the invention, each 3D holographic avatar completely envelopes a chosen physical target, as if the chosen physical target is wearing a holographic jumpsuit that also tracks and mimics the chosen physical target's movements and expressions. In particular, a 3D holographic avatar that visually encapsulates a physical target located in the mixed-reality environment serves the novel role of a full-body holographic jumpsuit that makes the physical target invisible while retaining real-time motions and expressions originating from the physical target, in the visual perspective of an HMR viewer wearing a mixed-reality headset or another viewing device.

If a physical target motion-mirrored by a 3D holographic avatar is a human or an animal, the physical target movement-mirroring avatar superimposition and visualization creation system tracks the physical target's movements as well as facial expressions, and then provides novel graphics processing steps on the fly to ensure that the 3D holographic avatar mimics all of the physical target's motions and expressions in real time. For example, if a human participant designated as a physical target waves and then puts his or her thumbs up, then the user-selected 3D holographic avatar that encapsulates the human participant in the mixed-reality environment (200) also waves and puts thumbs up to mirror the human participant in real time. The user-selected 3D holographic avatar is preferably a full life-size 3D avatar capable of rapid and natural motions that directly mirror, correlate, or reflect the underlying motions of the physical target.

In the preferred embodiment of the invention, the physical target movement-mirroring avatar superimposition and visualization creation system incorporates a scalable number of high performance computer servers and graphics processing units to enable the real-time physical target movement-mirroring and avatar superimposition by taking several graphics-intensive processing steps. In one instance of an embodiment of the invention, the physical target movement-mirroring avatar superimposition and visualization steps may involve the following multiple steps: (1) recognizing and correlating a particular physical target with a chosen 3D avatar previously synthesized or selected by a system user; (2) tracking motions and poses from the particular physical target and retargeting such motions and poses to the chosen 3D avatar based on deep-learning pose estimations; (3) matching extracted features or tracking points from the particular physical target with the chosen 3D avatar in real time; (4) executing motion retargeting by correlating the real-time motion tracking points of the particular physical target to the chosen 3D avatar to mirror and mimic the movements and the expressions of the particular physical target in the chosen 3D avatar; (5) completely enveloping or encapsulating the particular physical target to replace the naked-eye view of the particular physical target with the chosen 3D avatar that also mirrors and mimics the underlying motions and the expressions of the particular physical target, whenever the system viewer is immersed in a mixed-reality environment through a mixed-reality headset gear or another viewing device.

In the illustrative example as shown in FIG. 2, a specific 3D holographic avatar (e.g. 102B or 103B) is selected by a system user (e.g. 101, 102A, or 103A in FIG. 1) to represent a particular physical target through a system user interface. Once selected and activated to represent the particular physical target, the specific 3D holographic avatar is configured to encapsulate or envelope the particular physical target completely, thus making the particular physical target invisible from the HMR viewer's (101) perspective. The invisible physical target is visually and electronically replaced and motion-mirrored with the specific 3D holographic avatar while the mixed-reality environment (200) is active. Furthermore, as previously shown in FIG. 1, the physical targets (102A, 103A) are actually present in the physical space and certainly visible to naked-eyes viewers who are not wearing or utilizing mixed-reality viewing equipment.

Figure 3:
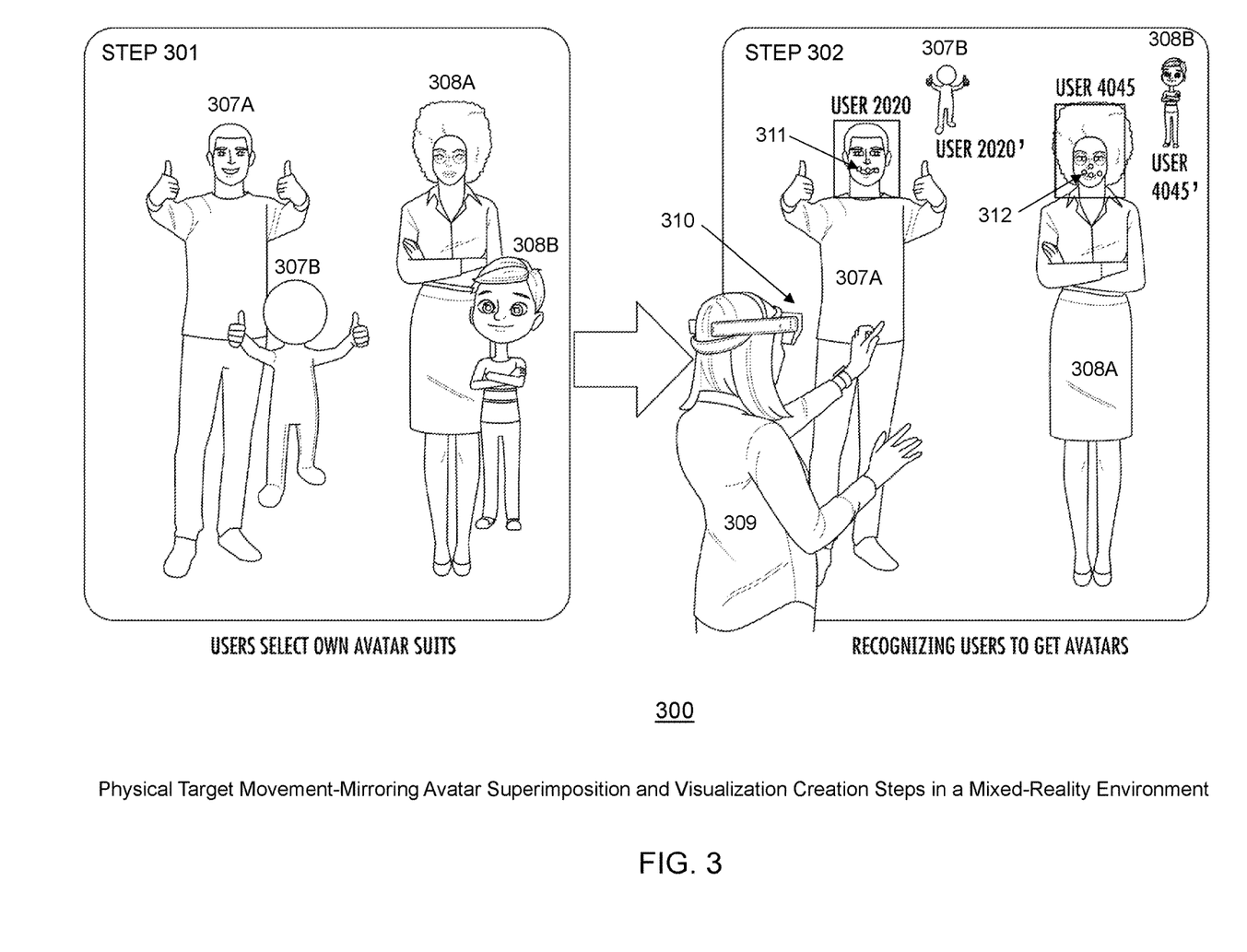
FIG. 3 shows first two steps in creating physical target movement-mirroring avatar superimposition and visualization in a mixed-reality environment by the novel electronic system, in accordance with an embodiment of the invention.

FIG. 3 shows first two steps (i.e. STEP 301 and STEP 302) in creating physical target movement-mirroring avatar superimposition and visualization in a mixed-reality environment (300) by the novel electronic system, in accordance with an embodiment of the invention. In STEP 301 as shown in FIG. 3, a system user (e.g. 307A, 308A, or 309) selects a 3D holographic avatar (e.g. 307B or 308B) to represent and substitute a particular physical object present in a physical space with the 3D holographic avatar, where the mixed-reality environment (300) is operated and provided by the physical target movement-mirroring avatar superimposition and visualization creation system. The particular physical object present in the physical space may be a human subject (e.g. 307A or 308A), an animal, or an inanimate object such as a painting, a piece of furniture, or another tangible item. Furthermore, the system user that selects the 3D holographic avatar (e.g. 307B or 308B) to substitute the particular physical object with the 3D holographic avatar may be the human subject (e.g. 307A or 308A) himself or herself in some instances, or a holographic mixed-reality (HMR) viewer (309) wearing a mixed-reality headset (310) in other instances.

In the example shown in STEP 301, a first 3D holographic avatar (307B) represents a first human subject (307A) with real-time motion and facial expression mirroring. Likewise, a second 3D holographic avatar (308B) represents a second human subject (308A) with real-time motion and facial expression mirroring. The physical target movement-mirroring avatar superimposition and visualization creation system includes a robust database of 3D holographic avatars created by third-party developers, graphics artists, or system users themselves. Furthermore, in the preferred embodiment of the invention, the real-time motion and facial expression mirroring achieve optimal computational efficiencies by utilizing an artificial intelligence (AI) and deep learning-based pose estimation engine for 3D holographic avatars and pre-defined pose feature databases for avatars, which in turn reduce graphics processing delay and computational burden in providing real-time motion and facial expression mirroring.

The second step in creating physical target movement-mirroring avatar superimposition and visualization in the mixed-reality environment (300) involves a machine-determined recognition of the first human subject (307A) and the second human subject (308A) through the mixed-reality headset (310) and/or cameras worn by the holographic mixed-reality (HMR) viewer (309), as shown in STEP 302. In one embodiment of the invention, based on user selection of 3D holographic avatars to complete visual encapsulation of the human subjects (307A, 308A) from STEP 301, the physical target movement-mirroring avatar superimposition and visualization creation system performs facial recognition algorithms on the subjects' faces (311, 312) in a subject feature extraction block (e.g. 607 in FIG. 6) and a subject-to-avatar recognition and pose tracking block (e.g. 605 in FIG. 6) to extract facial feature points, which are then utilized to determine, match, and retrieve the user-selected 3D holographic avatars (307B, 308B) that are intended to encapsulate the human subjects (307A, 308A) when viewed in the mixed-reality environment (300). In other embodiments of the invention, the matching determination and the retrieval of the user-selected 3D holographic avatars associated with a human subject or another real object present in a physical space may be based on gait, Bluetooth IDs, or other object identification methods.

In case of the illustrative example as shown in STEP 302 in FIG. 3, the subject-to-avatar recognition and pose tracking block (e.g. 605 in FIG. 6) in the physical target movement-mirroring avatar superimposition and visualization creation system internally identifies the first human subject (307A) as "USER 2020," and the second human subject (308A) as "USER 4045." In this example, the system's internal user identification designations are dynamically linked to the user-selected 3D holographic avatars that will act as full holographic body jumpsuits to the identified human subjects. Therefore, the system's determination of the first human subject (307A) as "User 2020" from its facial recognition process retrieves the graphics dataset for "User 2020-prime" (User 2020'), which in this case is the first 3D holographic avatar (307B) previously selected by the user in STEP 301 from a holographic avatar database. Likewise, the system's determination of the second human subject (308A) as "User 4045" from its facial recognition process retrieves the graphics dataset for "User 4045-prime" (User 4045'), which in this case is the second 3D holographic avatar (308B) previously selected by the user in STEP 301 from a holographic avatar database (e.g. 608 in FIG. 6). The holographic avatar database may also be operatively connected to app repository developer tools (e.g. 609 in FIG. 6) that enable a plurality of internal or third-party developers to provide various physical target movement-mirroring avatar superimposition desktop or mobile apps and a diverse set of 3D graphical avatars for the user to choose from.

Figure 4:
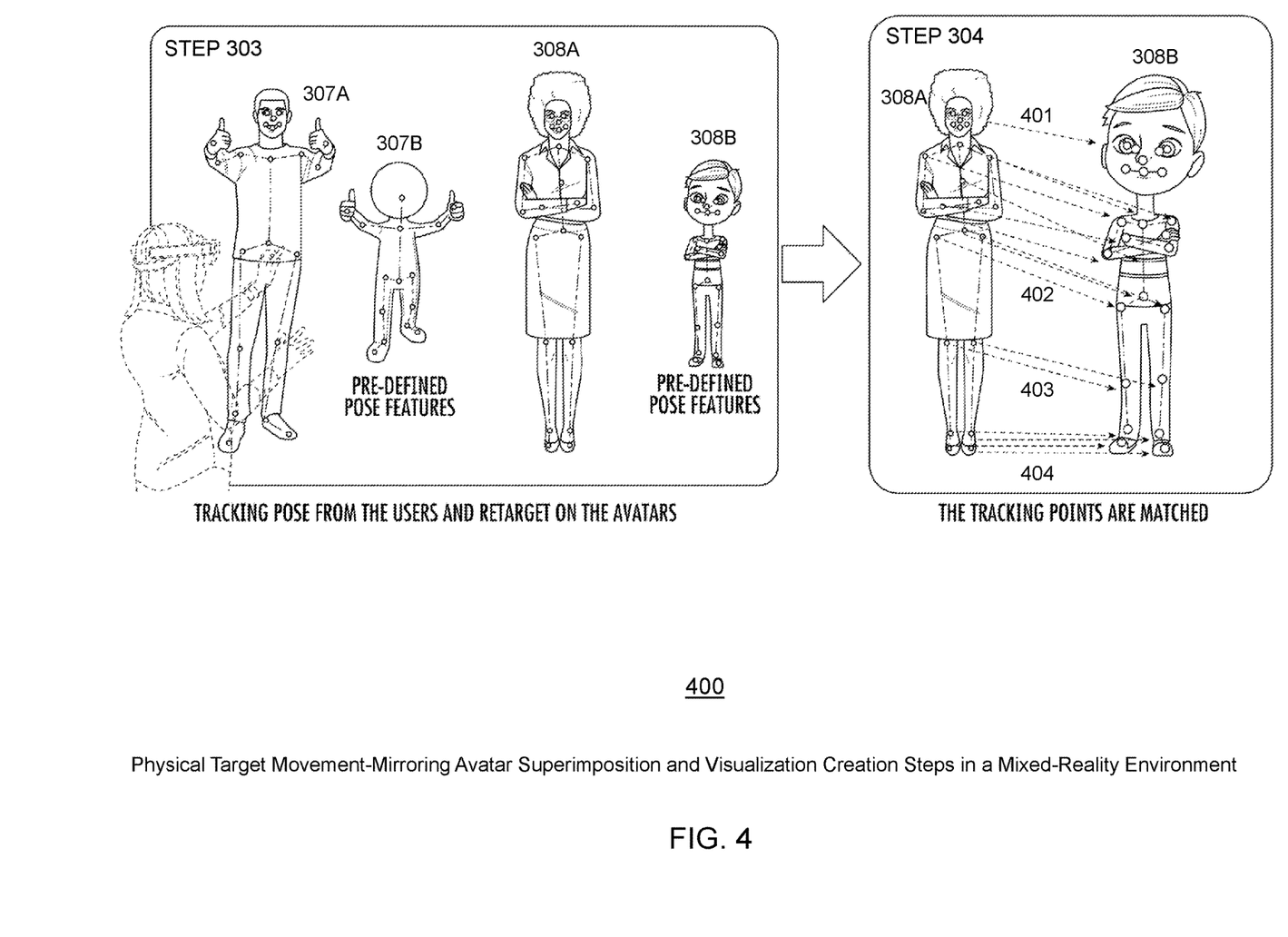
FIG. 4 shows third and fourth steps in creating physical target movement-mirroring avatar superimposition and visualization in a mixed-reality environment by the novel electronic system, in accordance with an embodiment of the invention.

FIG. 4 shows third and fourth steps (i.e. STEP 303 and STEP 304) in creating physical target movement-mirroring avatar superimposition and visualization in a mixed-reality environment (400) by the novel electronic system, in accordance with an embodiment of the invention. In the third step as shown in STEP 303, the physical target movement-mirroring avatar superimposition and visualization creation system is configured to track and recognize motions and poses of each human subject (i.e. 307A and 308B) by extracting graphical feature points of each subject's motions and poses in real time. The extracted graphical feature points are then inputted into a deep-learning artificial intelligence (AI) pose estimation engine (e.g. 610 in FIG. 6) for 3D holographic avatars to synthesize machine-determined pre-defined pose features and estimations to mirror the human subjects' motions and poses in the corresponding user-chosen 3D holographic avatars.

The newly-synthesized machine-determined pre-defined pose features and estimations are then further utilized in the fourth step by the physical target movement-mirroring avatar superimposition and visualization creation system to retarget and update motions and poses of a user-chosen 3D holographic avatar (e.g. 308B) to mirror a corresponding human subject (e.g. 308A), as shown in STEP 304. In the preferred embodiment of the invention, the human subject's (e.g. 308A) face, body, arms, and legs are dynamically tracked in real time with multiple tracking points (401, 402, 403, 404), which are assigned by a subject-to-avatar pose matching and real-time movement mirroring and retargeting engine (e.g. 603 in FIG. 6) of the physical target movement-mirroring avatar superimposition and visualization creation system.

In the preferred embodiment of the invention, the multiple tracking points (401, 402, 403, 404) enable real-time tracking of the detailed bodily and facial movements through continuous feature extractions of the human subject by the physical target movement-mirroring avatar superimposition and visualization creation system. The continuous feature extractions of the human subject are then matched to the user-chosen 3D holographic avatar (e.g. 308B) to invoke or create corresponding visual changes in the facial and the bodily expressions of the user-chosen 3D holographic avatar in real time, without perceptible delay from the eyes of the holographic mixed-reality (HMR) viewer (e.g. 309).

Figure 5:
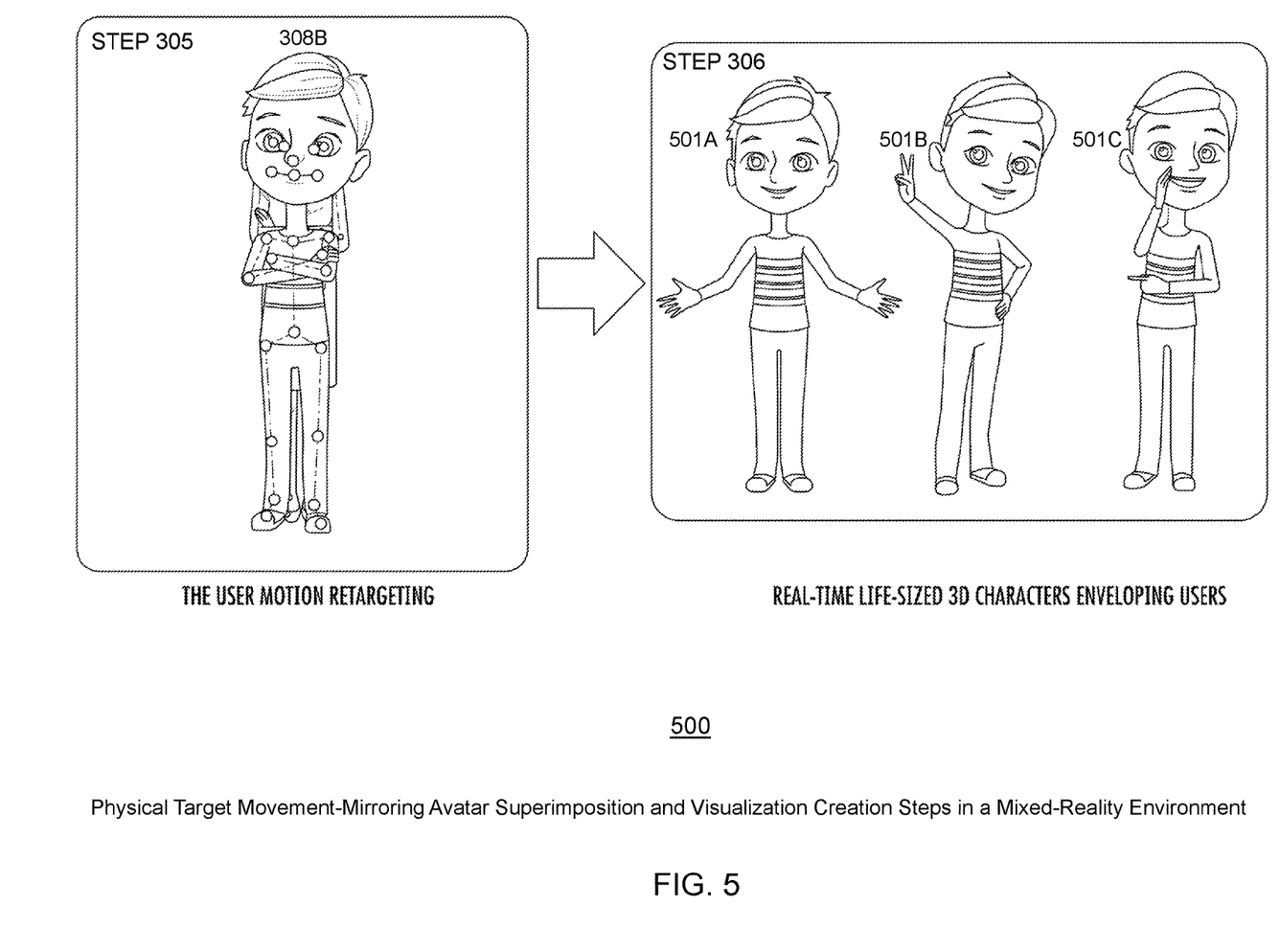
FIG. 5 shows fifth and sixth steps in creating physical target movement-mirroring avatar superimposition and visualization in a mixed-reality environment by the novel electronic system, in accordance with an embodiment of the invention.

FIG. 5 shows fifth and sixth steps (i.e. STEP 305 and STEP 306) in creating physical target movement-mirroring avatar superimposition and visualization in a mixed-reality environment (500) by the novel electronic system, in accordance with an embodiment of the invention. In the fifth step as shown in STEP 305, the subject-to-avatar pose matching and real-time movement mirroring and retargeting engine (e.g. 603 in FIG. 6) of the physical target movement-mirroring avatar superimposition and visualization creation system executes motion retargeting by correlating the real-time motion tracking points of the human subject (e.g. 308A in FIG. 4) to the user-chosen 3D holographic avatar (e.g. 308B) to mirror and mimic the movements and the expressions of the human subject in the user-chosen 3D holographic avatar.

In the preferred embodiment of the invention, the motion retargeting and mirroring performed by the subject-to-avatar pose matching and real-time movement mirroring and retargeting engine achieves additional efficiency and processing speed by querying a pre-defined pose feature database for avatars (e.g. 611 in FIG. 6) and rapidly determining the most appropriate changes in the avatar's pose based on the output recommendations from the deep-learning artificial intelligence (AI) pose estimation engine (e.g. 610 in FIG. 6) for 3D holographic avatars. When the human subject (e.g. 308A in FIG. 4) or another tracked physical target moves or changes expressions, the changes in pose and motion extraction point data for the tracked physical target invoke a similar magnitude of pose and motion changes in the user-chosen 3D holographic avatar (e.g. 308B). Such reflective and corresponding changes in motion and expressions in the user-chosen 3D holographic avatar fundamentally "mirror" whatever the underlying physical target is doing, while the physical target still remains invisible and totally encapsulated by the user-chosen 3D holographic avatar in the eyes of the holographic mixed-reality (HMR) viewer.

Once the subject-to-avatar pose matching and real-time movement mirroring and retargeting engine (e.g. 603 in FIG. 6) of the physical target movement-mirroring avatar superimposition and visualization creation system completes the motion retargeting synthesis for the user-chosen 3D holographic avatar (e.g. 308B), a subject movement-mirroring avatar and motion-retargeting 3D hologram image generator (e.g. 604 in FIG. 6) utilizes the synthesized retargeted motion data to generate one or more updated motion frames (501A, 501B, 501C) for the user-chosen 3D holographic avatar, as shown in STEP 306 in FIG. 5. Then, an avatar visualizer block (e.g. 606 in FIG. 6) in the physical target movement-mirroring avatar superimposition and visualization creation system can display the updated motion frames (501A, 501B, 501C) for the user-chosen 3D holographic avatar in the eyes of the holographic mixed-reality (HMR) viewer, when the mixed-reality environment (500) is active. When a human subject or another physical target moves, the user-chosen 3D holographic avatar also moves within the mixed-reality physical space in equal direction and magnitude to mirror the physical target's changes in motion and location, while keeping the underlying physical target encapsulated and invisible to the HMR viewer.

As illustrated and described in conjunction with FIGS. 3-5, the resulting effect of the physical target movement-mirroring avatar superimposition and visualization creation steps is a novel mixed-reality environment in which a holographic mixed-reality (HMR) viewer visualizes and interacts with a user-chosen 3D avatar that mirrors and mimics the underlying motions and the expressions of a physical target also present in the mixed-reality space, while the physical target itself remains invisible to the HMR viewer wearing a headset gear or another mixed-reality viewing device.

Figure 6:
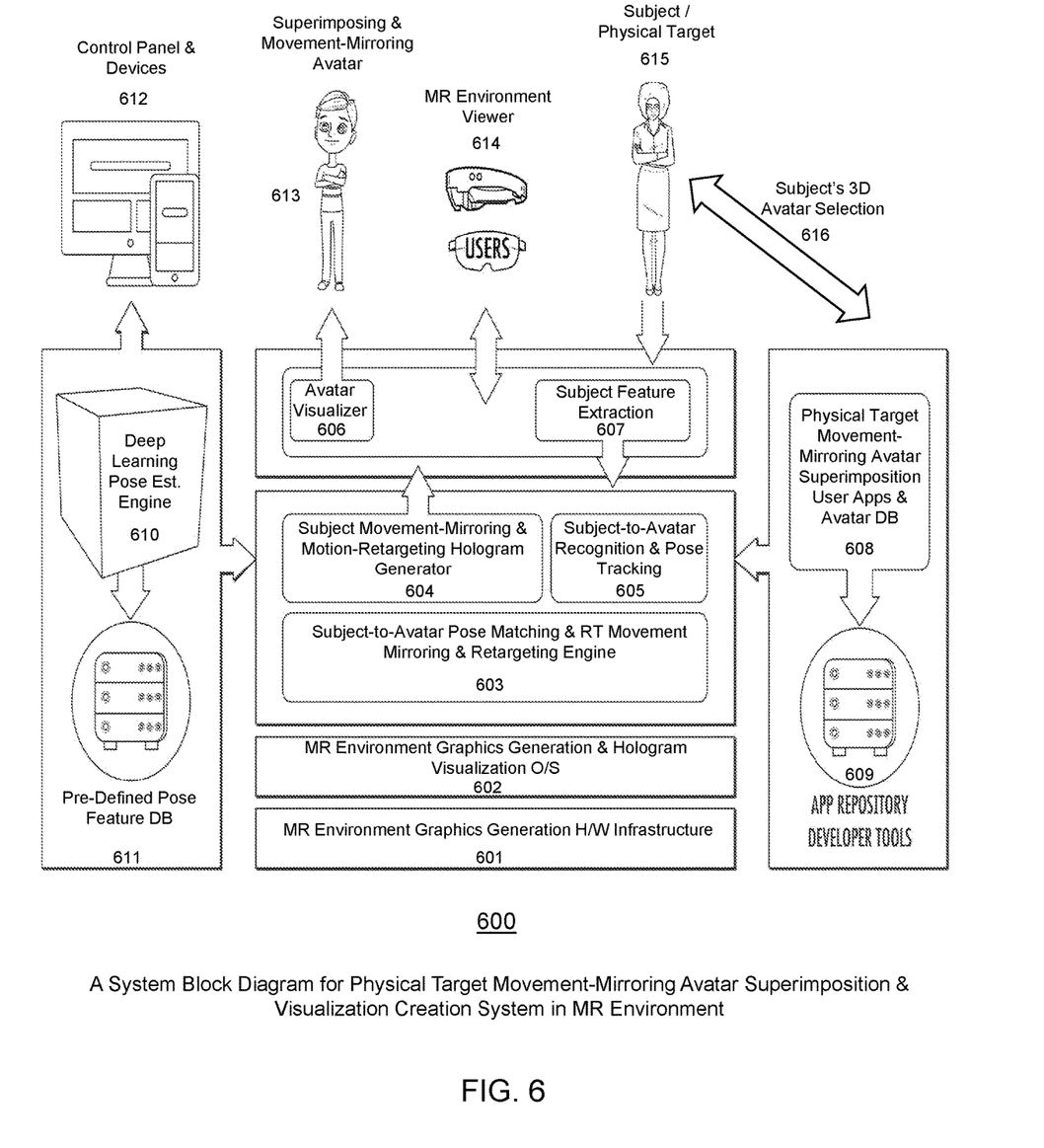
FIG. 6 shows a system block diagram for physical target movement-mirroring avatar superimposition and visualization creation system in a mixed-reality environment, in accordance with an embodiment of the invention.

FIG. 6 shows a system block diagram (600) for the physical target movement-mirroring avatar superimposition and visualization creation system in a mixed-reality environment, in accordance with an embodiment of the invention. In this example, the system incorporates a mixed-reality (MR) environment graphics generation hardware (H/W) infrastructure (601), which comprises graphics processing units (GPUs), memory units, non-volatile data storages, graphics servers incorporating GPUs for additional computations and network communications, cloud-networked scalable computing resources, and/or other hardware components for 3D hologram generation, motion retargeting, and visualization in the MR environment.

Furthermore, as shown in the system block diagram (600), the physical target movement-mirroring avatar superimposition and visualization creation system also includes a mixed-reality (MR) environment graphics generation and holographic 3D visualization operating system (602), which is executed in the GPUs and the memory units of the MR environment graphics generation H/W infrastructure (601). This operating system serves as a foundation software operation layer for mixed-reality scenario design capabilities, subject-to-avatar recognition, subject-to-avatar real-time motion-retargeting, and holographic visualization tasks that are further enabled by novel application layers and programs (e.g. 603, 604, 605, 606, 607, 608, 609, 610, 611), which are dynamically executed on top of the mixed-reality (MR) environment graphics generation and holographic 3D visualization operating system (602).

The physical target movement-mirroring avatar superimposition and visualization creation system further comprises a subject-to-avatar pose matching and real-time movement mirroring and retargeting engine (603), a subject movement-mirroring avatar and motion-retargeting 3D hologram image generator (604), and a subject-to-avatar recognition and pose tracking block (605), as illustrated in the system block diagram (600) in FIG. 6. In the preferred embodiment of the invention, the subject-to-avatar recognition and pose tracking block (605) is configured to receive subject feature extraction points, typically through a camera installed on a mixed-reality headset worn by an MR environment user and/or viewer (614). The initial feature extractions from captured image frame(s) of a physical target (615) may be performed by a subject feature extraction block (607), which is an analog-to-digital image conversion and processing module configured to provide the subject feature extraction points that uniquely and digitally represent image information in the captured image frame(s). The subject feature extraction block (607), as illustrated in the system block diagram (600), can be incorporated into the mixed-reality headset unit locally or into the application layer structure on top of the MR environment graphics generation and holographic 3D visualization operating system (602).

After receiving the subject feature extraction points from the subject feature extraction block (607), the subject-to-avatar recognition and pose tracking block (605) attempts to match the subject feature extraction points with a known image identification dataset in a physical target image database. If the physical target (615) is successfully identified through the subject feature extraction points comparison with the known identification dataset, the subject-to-avatar recognition and pose tracking block (605) inquires a physical target movement-mirroring avatar superimposition user apps and avatar database (608) to retrieve a particular 3D holographic avatar (613), which is previously selected by a user to encapsulate the physical target (615) in the mixed-reality environment. The physical target movement-mirroring avatar superimposition user apps and avatar database (608) may also be operatively connected to app repository developer tools (609) that enable a plurality of internal or third-party developers to provide various physical target movement-mirroring avatar superimposition desktop or mobile apps and a diverse set of 3D graphical avatars for the user to choose from. This process is also previously described in conjunction with STEP 302 in FIG. 3. If the physical target (615) is a human subject, the subject can make a 3D avatar selection directly (i.e. 616) through a mobile application on the subject's smart phone, or through system control panel and devices (612) connected to the physical target movement-mirroring avatar superimposition and visualization creation system, as shown in FIG. 6.

Once the user-chosen 3D holographic avatar (613) is retrieved as a correct encapsulating "jumpsuit" match to the physical target (615), the subject-to-avatar recognition and pose tracking block (605) also begins to track motions and expressions of the physical target (615), and transmit the dynamically-changing feature extraction points from the captured image frames to the subject-to-avatar pose matching and real-time movement mirroring and retargeting engine (603), as shown in the system block diagram (600). In the preferred embodiment of the invention, the subject-to-avatar pose matching and real-time movement mirroring and retargeting engine (603) executes motion retargeting by correlating the real-time motion tracking points of the physical target (615) to the user-chosen 3D holographic avatar (613) to mirror and mimic the movements and the expressions of the physical target (615) in the user-chosen 3D holographic avatar (613).

In the preferred embodiment of the invention, the motion retargeting and mirroring performed by the subject-to-avatar pose matching and real-time movement mirroring and retargeting engine (603) achieves additional efficiency and processing speed by querying a pre-defined pose feature database for avatars (611 in FIG. 6) and rapidly determining the most appropriate changes in the avatar's pose based on the output recommendations from a deep-learning artificial intelligence (AI) pose estimation engine (610 in FIG. 6) for 3D holographic avatars. For instance, when the motion and expression-tracked physical target (615) moves or changes facial or bodily expressions, the changes in pose and motion extraction point data for the tracked physical target (615) invoke a similar magnitude of pose and motion changes in the user-chosen 3D holographic avatar (613). Such reflective and corresponding changes in motion and expressions in the user-chosen 3D holographic avatar (613) fundamentally "mirror" whatever the underlying physical target is doing, while the physical target still remains invisible and totally encapsulated by the user-chosen 3D holographic avatar (613) in the eyes of the MR environment user and/or viewer (614).

Once the subject-to-avatar pose matching and real-time movement mirroring and retargeting engine (603) of the physical target movement-mirroring avatar superimposition and visualization creation system completes the motion retargeting synthesis for the user-chosen 3D holographic avatar (613), a subject movement-mirroring avatar and motion-retargeting 3D hologram image generator (604) utilizes the synthesized retargeted motion data to generate one or more updated motion frames for the user-chosen 3D holographic avatar (613), as previously shown in STEP 306 of FIG. 5. Then, an avatar visualizer block (606) in the physical target movement-mirroring avatar superimposition and visualization creation system can display the updated motion frames for the user-chosen 3D holographic avatar (613) in the eyes of the MR environment user and/or viewer (614), when the mixed-reality environment is active. In the preferred embodiment of the invention, when a human subject or another physical target moves, the user-chosen 3D holographic avatar also moves within the mixed-reality physical space in equal direction and magnitude to mirror the physical target's changes in motion and location, while keeping the underlying physical target encapsulated and invisible to the HMR viewer.

Furthermore, in one embodiment of the invention, a rapid three-dimensional holographic model generation from a dedicated real-time model reconstruction studio with multiple camera angles may be utilized as a component of the physical target movement-mirroring avatar superimposition and visualization creation system for synthesizing 3D holographic avatar models. The rapid 3D holographic model generation may utilize the app repository developer tools (609) and the physical target movement-mirroring avatar superimposition user apps and avatar database (608), as shown in the system block diagram (600) in FIG. 6.

In a preferred embodiment of the invention, the dedicated real-time model reconstruction studio with multiple camera angles is called "HoloPortal." HoloPortal is a 3D model creation studio with a real-time or near real-time 3D reconstruction system. This 3D model creation studio is configured to place a target object (e.g. a human, an animal, or another moving object) in a designated area of the 3D model creation studio that positions a plurality of cameras in various angles around the designated area to capture multi-angle video footages of the target object. Then, the multi-angle video footages are processed, transformed, and reconstructed as dynamic 3D models, which may include 3D mesh models, textures for all related frames, and movement frames associated with the target object. After the dynamic 3D models, also called herein as "3D body doubles" are generated from the HoloPortal, the dynamic 3D models can be stored in a 3D holographic avatar database (e.g. 608 in FIG. 6).

Then, the physical target movement-mirroring avatar superimposition and visualization creation system synthesizes a 3D mixed-reality artificial layer, where one or more dynamic 3D models are selected and placed into specific virtual coordinates next to locations of physical objects as mixed-reality objects (MROs) or mixed-reality holograms (MRHs), in accordance with a mixed-reality designer's intended user interaction choreographies. At least some of MROs and MRHs in such mixed-reality environments may be user-selected 3D holographic avatars configured to mirror the movements and the expressions of a physical target in real time. Furthermore, the HoloPortal and the physical target movement-mirroring avatar superimposition and visualization creation system may be dynamically linked to an electronic social platform for sharing, monetizing, and viewing a variety of dynamic 3D models stored in the 3D model database. These dynamic 3D models may be generated in 3D model formats such as OBJ's and/or COLLADA's.

In one example, HoloPortal first records multi-angle videos from a multiple number of cameras surrounding the designated area. Then, the multi-angle videos undergo silhouette extractions, 3D voxel generation, 3D mesh generation, deformed 3D mesh generation, and texture-on-mesh generation to create a 3D model, or a "3D body double" model through a variety of data transformations and graphics reconstructions executed on graphics processing units incorporated in or associated with the HoloPortal. Preferably, the HoloPortal can generate 3D models (e.g. "3D body doubles") and 3D contents in real-time or near real-time, without lengthy and laborious conventional methods of 3D content generation processes that can take many hours to many months. Furthermore, the 3D models generated from the HoloPortal can be utilized in as characters in a mixed-reality application, an augmented reality application, a virtual reality application, a 3D computerized game, or a 3D animation movie. For example, a holographic 3D model (e.g. a "three-dimensional (3D) body double" model created after the multi-angle video capture of a human figure) may be created and inserted into a mixed-reality artificial layer correlated to a particular physical space in virtual coordinates as a 3D holographic avatar, which is configured to mirror movements and expressions of a physical target in real time. Moreover, in some embodiments of the invention, a computerized 3D model created from the HoloPortal may also be physically manufactured with a 3D printing machine located within or outside the HoloPortal for commercial, promotional, business, or transactional purposes.

Furthermore, in some embodiments of the invention, the physical target movement-mirroring avatar superimposition and visualization creation system may utilize another component called "HoloCloud" for creation of a three-dimensional holographic model, instead of or in combination with the HoloPortal. The HoloCloud system provides a rapid three-dimensional model generation process from uncalibrated multiple sources of video recording of a targeted object and subsequent cloud computing-based video data calibration and three-dimensional reconstruction of the targeted object. Typically, the HoloCloud system comprises a plurality of common consumer-level video recording devices (e.g. smartphones, camcorders, digital cameras, etc.) positioned in various angles surrounding a target object (e.g. a human, an animal, a moving object, etc.), a scalable number of graphic processing units (GPU's) in a scalable cloud computing platform, a 3D pre-processing module, a 3D reconstruction module, a background 3D graphics content, a 360-degree virtual reality or video content, and a dynamic 3D model created by the 3D reconstruction module.

The plurality of common consumer-level video recording devices generate a plurality of digitized video feeds (e.g. Video 1, Video 2, . . . Video n) in various angles for a target object, and then utilizes an integrated or standalone wireless transceiver (e.g. a cellular transceiver, a WiFi LAN transceiver, etc.) to transmit the plurality of digitized video feeds to a HoloCloud graphics processing unit (GPU) in a cloud computing platform. In a preferred embodiment, the HoloCloud GPU incorporates a pre-processing module and a 3D reconstruction module. The pre-processing module is configured to calibrate temporal, spatial, and photometrical variables of the multi-angle digitized video feeds, and is also able to generate background 3D geometry and 360-degree virtual reality video. The 3D reconstruction module is configured to provide depth map computations, voxel grid reconstructions, and deformed mesh generations for eventual generation of dynamic 3D models. After numerous internal stages of video extractions, transformations, and reconstruction through the HoloCloud GPU, the background 3D graphics content, the 360-degree virtual reality or video content, and the dynamic 3D models are electronically generated and subsequently utilized as 3D figures, graphics, or holograms in mixed-reality applications related to the physical target movement-mirroring avatar superimposition and visualization creation system.

Pre-processing and reconstruction procedures for the HoloCloud system require cloud computing-based video data calibration and three-dimensional reconstructions of a targeted object, in accordance with an embodiment of the invention. A multiple number of common consumer-level video recording devices generates a plurality of digitized video feeds (e.g. Video 1, Video 2, . . . Video n) in various angles for a target object, and then transmit the plurality of digitized video feeds to a HoloCloud graphics processing unit (GPU) in a cloud computing platform. Typically, the cloud computing platform is a collective number of graphics computing machines that are dynamically scalable to deploy and assign a flexible number of GPU's for parallel processing, depending on the intensity of graphics computation, transformation, and reconstruction requirements for the plurality of digitized video feeds. For example, a larger number of GPU's may be assigned to perform 3D graphics processing if the plurality of digitized video feeds has a high video feed count, long durations, and/or higher resolutions. In contrast, a smaller number of GPU's may be assigned to perform 3D graphics processing if the plurality of digitized video feeds has a low video feed count, short durations, and/or lower resolutions.

In cloud computing-based video data calibration and three-dimensional reconstructions of the targeted object, each HoloCloud GPU can incorporate a pre-processing module and a 3D reconstruction module. The pre-processing module executes calibration of temporal, spatial, and photometrical variables of the multi-angle digitized video feeds, and is also able to generate background 3D geometry and 360-degree virtual reality video. The 3D reconstruction module, on the other hand, performs depth map computations, voxel grid reconstructions, and deformed mesh generations for eventual generation of dynamic 3D models or characters.

After numerous internal stages of video extractions, transformations, and reconstruction through one or more HoloCloud GPU's that are typically configured to scale and parallel-process a varying amount of workload for 3D content generation, the background 3D geometry graphics content, the 360-degree virtual reality video content, and the dynamic 3D model are electronically generated and subsequently utilized as 3D figures or graphics in a mixed-reality application. The HoloCloud system, which utilizes a plurality of common consumer-level video recording devices for multi-angle video feeds of a target object and a scalable number of HoloCloud GPU's for video extractions, transformations, and reconstruction of dynamic 3D models, enables casual (i.e. non-technical or not technically skillful) consumers to be professional-level 3D content creators or mixed-reality experience designers, who are able to capture and generate 3D graphics contents rapidly and inexpensively without necessitating specialized 3D content recording equipment and/or high-powered 3D graphics computing equipment on site that are typically required in conventional 3D content generation.

Furthermore, by wirelessly transmitting the recorded multi-angle video feeds to a scalable number of HoloCloud GPU's executed in a cloud computing network that processes high-powered graphics computing tasks to generate dynamic 3D models, a casual content creator is not required to have an expert knowledge of 3D graphics pre-processing and reconstruction processes that may be electronically executed by a third-party HoloCloud service operator. Therefore, various embodiments of the present invention enable convenient and pervasive casual user-created dynamic 3D hologram models and 3D contents, which were previously difficult to generate with conventional 3D content generation solutions.

In order to initiate creation of holographic contents for mixed-reality applications, two methods of ubiquitous and rapid three-dimensional model content generation and robust social sharing of holographic contents by casual (i.e. non-graphics expert) consumers can be utilized in accordance with various embodiments of the invention. A first method of ubiquitous and rapid three-dimensional model content generation involves a dedicated 3D content generation studio (i.e. "HoloPortal") that allows a casual consumer to walk into a HoloPortal facility to capture multi-angle video feeds from professionally-installed multiple cameras surrounding a targeted area in the HoloPortal for a dynamic 3D model generation from onsite graphics processing units. On the other hand, a second method of ubiquitous and rapid three-dimensional model content generation involves a plurality of consumer cameras at any location of a casual consumer's choice to capture multi-angle video feeds around a target object, wherein the multi-angle video feeds are subsequently transmitted to a cloud computing resource specializing in 3D graphics processing to generate a dynamic 3D model. As described previously, this second method of the dynamic 3D model generation is called "HoloCloud."

Various embodiments of physical target movement-mirroring avatar superimposition and visualization creation systems operating in a mixed-reality environment and related methods of operating such systems described herein provide significant advantages to conventional augmented reality, virtual reality, or mixed-reality applications. For example, an embodiment of the present invention provides a novel electronic system and a related method of operation that enable more advanced levels of interactivity and visualizations in a mixed-reality environment. Examples of such advanced levels of interactivity and visualizations in a mixed-reality environment include, but are not limited to, virtualized switchover roles and images between holograms and physical objects, and dynamic real-time rendering of holographic motions superimposed on targeted physical objects.

Furthermore, another embodiment of the present invention provides a novel electronic system and a related method of operation that accommodate physical target movement-mirroring avatar superimposition and visualization in a mixed-reality environment for enhanced immersive mixed-reality contents and mixed-reality choreographic scenario design flexibilities.

In addition, an embodiment of the present invention provides a novel electronic system that empowers a mixed-reality system user with electronic user interfaces, physical target movement-mirroring avatar superimposition user apps and avatar databases, and app repository developer tools to create, select, or modify a preferred 3D holographic avatar as a holographically motion-mirrored and fully encapsulated and computerized visual representation of herself or himself for real-time viewing by other users immersed in a mixed-reality environment.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the claims.

What is claimed is:

1. A method for creating physical target movement-mirroring three-dimensional (3D) holographic avatar superimposition and visualization in a mixed-reality environment, the method comprising the steps of:

choosing, via a system user application interface, a 3D holographic avatar that visually encapsulates and replaces a visual presence of a physical target wherein the 3D holographic avatar becomes a movement-mirroring substitute for the physical target at the physical target's current location while also making the physical target completely invisible in the mixed-reality environment generated by a physical target movement-mirroring 3D holographic avatar superimposition and visualization creation system;

recognizing and correlating the physical target with the 3D holographic avatar by capturing an image of the physical target in a camera of a mixed-reality headset worn by a holographic mixed-reality (HMR) viewer, extracting graphical feature points from the image, comparing the graphical feature points to various 3D holographic avatars stored in a physical target movement-mirroring avatar database, and finding a correct match for a graphical similarity between the physical target and the 3D holographic avatar previously chosen by a user to encapsulate and replace the physical target in the mixed-reality environment;

tracking motions and poses of the physical target via a continuous image capturing from the camera on the mixed-reality headset and a real-time extraction of moving graphical feature points of the physical target;

retargeting the motions and the poses of the physical target to the 3D holographic avatar by matching tracking points of similar body parts and facial features between the physical target and the 3D holographic avatar, and by executing a deep-learning pose estimation engine that retrieves a matching pose feature from a pre-defined pose feature database for 3D holographic avatars;

continuously matching the tracking points of similar body parts and facial features between the physical target and the 3D holographic avatar in real time as long as the physical target is making a movement or a change in facial or bodily expressions while being present in the mixed-reality environment;

continuously executing motion retargeting, in real time, from the physical target to the 3D holographic avatar to mirror and mimic the movement or the change in facial or bodily expressions; and from a visual perspective of the HMR viewer wearing the mixed-reality headset or another viewing device, encapsulating and replacing the physical target with the 3D holographic avatar as the movement-mirroring substitute for the physical target at the physical target's current location while also making the physical target completely invisible in the mixed-reality environment, wherein the 3D holographic avatar also mirrors and mimics the motions and the poses of the physical target in real time, whenever the mixed-reality environment is active.

2. The method of claim 1, wherein the physical target is a human subject, an animal, or an inanimate object physically present in a physical space of the mixed-reality environment.

3. The method of claim 2, wherein the user that chooses the 3D holographic avatar to encapsulate the physical target is the human subject or the HMR viewer.

4. The method of claim 1, wherein the physical target movement-mirroring 3D holographic avatar superimposition and visualization creation system comprises a mixed-reality environment graphics generation hardware infrastructure, a mixed-reality environment graphics generation and holographic 3D visualization operating system, a subject-to-avatar pose matching and real-time movement mirroring and retargeting engine, a subject-to-avatar recognition and pose tracking block, a subject feature extraction block, a subject movement-mirroring avatar and motion-retargeting 3D hologram image generator, and an avatar visualizer block.

5. The method of claim 4, wherein the physical target movement-mirroring 3D holographic avatar superimposition and visualization creation system further comprises a physical target movement-mirroring avatar superimposition user applications and avatar database, the pre-defined pose feature database for 3D holographic avatars, the deep-learning pose estimation engine, and the mixed-reality headset.

6. The method of claim 4, wherein the mixed-reality environment graphics generation hardware infrastructure further comprises a scalable number of graphics processing units (GPUs), computer servers, and cloud computing resources to execute the mixed-reality environment graphics generation and holographic 3D visualization operating system, the subject-to-avatar pose matching and real-time movement mirroring and retargeting engine, the subject-to-avatar recognition and pose tracking block, the subject feature extraction block, the subject movement-mirroring avatar and motion-retargeting 3D hologram image generator, and the avatar visualizer block.

7. The method of claim 1, wherein the 3D holographic avatar is one of humanized figures, cartoon figures, animals, or nonlife objects.

8. The method of claim 1, wherein the system user application interface is generated by a desktop application executed in a personal computer, a mobile application executed in a mobile device, or a wearable device application executed in the mixed-reality headset.

9. The method of claim 1, wherein the physical target movement-mirroring avatar database is operatively connected to a user application database and application repository developer tools.

10. The method of claim 1, wherein the 3D holographic avatar that visually encapsulates the physical target located in the mixed-reality environment operates as a full-body holographic jumpsuit that makes the physical target invisible while retaining real-time motions and expressions originating from the physical target, in the visual perspective of the HMR viewer wearing the mixed-reality headset or another viewing device.

* * * * *